United States Patent [15] 3,679,290
Adams et al. [45] July 25, 1972

[54] LIQUID CRYSTAL OPTICAL FILTER SYSTEM

[72] Inventors: James E. Adams, Ontario; Lewis B. Leder, Rochester; Werner E. L. Haas, Webster, all of N.Y.

[73] Assignee: Xerox Corporation, Stamford, Conn.

[22] Filed: Jan. 6, 1971

[21] Appl. No.: 104,369

[52] U.S. Cl. ...........................350/157, 252/300, 350/166, 350/313, 350/316
[51] Int. Cl. .........................................................G02f 1/16
[58] Field of Search...................350/157, 160, 166, 313, 316; 252/300

[56] References Cited

UNITED STATES PATENTS 3,582,225  6/1971  Nicastro ...............................350/160
3,592,526  7/1971  Dreyer...................................350/159

Primary Examiner—William L. Sikes
Assistant Examiner—Edward S. Bauer
Attorney—James J. Ralabate, David C. Petre and Gaetano D. Maccarone

[57] ABSTRACT

An optical filter system capable of transmitting light at substantially all wavelengths of incident radiation while simultaneously reflecting radiation at a single wavelength band or plurality of wavelength bands within the incident radiation is described. The system employs liquid crystal films having optically negative properties but which are opposite in intrinsic screw sense.

20 Claims, 8 Drawing Figures

PATENTED JUL 25 1972 3,679,290

INVENTORS
JAMES E. ADAMS
LEWIS B. LEDER
WERNER E. L. HAAS

BY  *J. D. Maccarone*

ATTORNEY

LIQUID CRYSTAL OPTICAL FILTER SYSTEM

BACKGROUND OF THE INVENTION

This invention relates to an optical filter system and more specifically to an optical filter system which employs liquid crystalline substances.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a structure which is unique to each of the three mesomorphic structures. Each of these structures is well known in the liquid crystal art.

Liquid crystals have been found to be sensitive or responsive to temperature, pressure, shear, foreign chemical compounds and to electric and magnetic fields, as disclosed in co-pending applications Ser. No. 646,532 filed June 16, 1967; Ser. No. 646,533 filed June 16, 1967, and now abandoned; Fegason et al., U.S. Pat. No. 3,114,838; French Pat. No. 1,484,584; and Fegason U.S. Pat. No. 3,409,404. Liquid crystals have also been found to be useful in imaging systems such as are described in co-pending applications Ser. No. 821,565 filed May 5, 1969 and Ser. No. 867,593 filed Oct. 20, 1969.

In growing areas of technology such as liquid crystals, new methods, apparatus, compositions and articles of manufacture are often discovered for the application of the technology in a new mode. The present invention relates to a novel and advantageous optical filter system utilizing liquid crystalline substances.

SUMMARY OF THE INVENTION

It is therefore, an object of this invention to provide a novel optical filter system.

It is another object of the invention to provide an optical filter system which utilizes liquid crystalline substances having optically negative properties.

It is still another object of the invention to provide an optical filter system which will permit transmission of substantially all wavelengths of incident radiation between and including the ultra-violet and infra-red regions of the electromagnetic spectrum while simultaneously reflecting one or more selected wavelength bands within said incident radiation.

A further object of the invention is to provide an optical filter system which is suitable for use in the ultra-violet, visible and infra-red regions of the electromagnetic spectrum.

Still another object of the invention is to provide relatively inexpensive optical filters.

A further object of the invention is to provide optical filters in relatively large sizes.

The foregoing and other objects and advantages are realized according to the invention, generally speaking, by making use of the unique optical properties of liquid crystalline substances which possess optically negative characteristics. Birefringence, also referred to as double refraction, is an optical phenomenon characteristic of some solid crystals and most liquid crystal substances. When a beam of unpolarized light strikes a birefringent substance it is split into two polarized components whose transverse vibrations are at right angles to each other. The two components are refracted at different angles through the substance and emerge as beams of polarized light. By the term "liquid crystalline substances which have optically negative characteristics," as used herein, is meant those for which the extraordinary index of refraction $\eta_E$ is smaller than the ordinary index of refraction $\eta_O$. Cholesteric liquid crystal substances exhibit this property. For a detailed description of this phenomenon see *Optical Crystallography*, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of this configuration of the molecules the direction of the long axes of the molecules in each layer is displaced slightly from the corresponding direction in adjacent layers. This displacement is cumulative over successive layers so that the overall displacement traces out a helical path. A comprehensive description of the structure of cholesteric liquid crystals is given in "Molecular Structure and the Properties of Liquid Crystals," G. W. Gray, Academic Press 1962.

Cholesteric liquid crystals have the property that when the propagation direction of plane polarized or unpolarized light is along the helical axis thereof, i.e., when the light enters in a direction perpendicular to the long axes of the molecules, this light is essentially unaffected in transmission through thin films of such liquid crystals except for a wavelength band centered about some wavelength $\lambda_o$ where $\lambda_o = 2\ np$ with $n$ representing the index of refraction of the liquid crystal substance and $p$ the pitch or repetition distance of the helical structure. The bandwidth $\Delta\lambda$ of this wavelength band centered about $\lambda_o$ will typically be of the order of about $\lambda_o/14$. For light of a wavelength $\lambda_o$ the cholesteric liquid crystal, under these conditions exhibits selective reflection of the light such that approximately 50 percent of the light is reflected and approximately 50 percent is transmitted, (assuming negligible absorption which is usually the case) with both the reflected and transmitted beams being approximately circularly polarized.

For light having wavelengths around $\lambda_o$ but not at $\lambda_o$ the same effect is present but not completely. The transmitted light is not circularly polarized but is instead elliptically polarized. The cholesteric liquid crystals which exhibit this property of selective reflection of light in a region centered around some wavelength $\lambda_o$ are said to be in the Grandjean or "disturbed" texture. If $\lambda_o$ is in the visible spectrum the liquid crystalline film appears to have the color corresponding to $\lambda_o$ and if $\lambda_o$ is outside the visible spectrum the film appears colorless.

Further depending upon the intrinsic rotatory sense of the helical nature of the substance, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helical nature of the substance. Thus, a cholesteric liquid crystal having an intrinsic helical structure which is left-handed in sense will transmit LHCPL and one having a helical structure which is right-handed in sense will transmit RHCPL.

Hereinafter these cholesteric liquid crystal substances will be identified in order to conform with popular convention, by the kind of light which is reflected at $\lambda_o$. When a film is said to be right-handed it is meant that it reflects RHCPL and when a film is said to be left-handed it is meant that it reflects LHCPL.

A right-handed cholesteric liquid crystal substance transmits LHCPL essentially completely at $\lambda_o$ whereas the same substance reflects almost completely RHCPL. Conversely a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50 percent transmitting at $\lambda_o$ for these sources when the liquid crystal is in its Grandjean texture. FIG. 1 illustrates the intensity of the output for a liquid crystal substance having a $\lambda_o$ of 4,000A when white light is directed upon it.

A further unique optical property of optically negative liquid crystal films is that contrary to the normal situation when light is reflected, such as by a mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o$ is directed at a right-hand film having $\lambda_o = 2\ np$ it is substantially completely reflected and, after reflection, remains RHCPL. If the same light were to be directed on a mirror the reflected light would be LHCPL. The invention utilizes these unique properties of optically negative liquid crystal substances to provide a novel optical filter system.

According to the invention the two optically negative liquid crystal films having the same $\lambda_o$ value but which are opposite in intrinsic rotatory sense are arranged in combination and incident light is directed upon the device, preferably in a manner such that the direction of light propagation is along the helical axes of the liquid crystal substances. The wavelengths of the incident light which are far from $\lambda_o$, i.e., those which are outside the wavelength band centered around $\lambda_o$ are essentially completely transmitted by the liquid crystal films. Consider, however, what occurs within the band of wavelengths centered around $\lambda_o$. For purposes of discussion it will be assumed that the incident light initially contacts the left hand liquid crystal film and subsequently the right hand film; however, it is to be recognized that the same effect would be obtained if the position of the films relative to each other were to be reversed. The LHCPL component of the incident light around $\lambda_o$ strikes the left-hand liquid crystal film and is essentially reflected. The RHCPL component of the incident light around $\lambda_o$ is essentially completely transmitted by the left-hand film. Upon coming in contact with the right-hand liquid crystal film the RHCPL component is essentially completely reflected with the reflected light remaining RHCPL and being directed back upon the left-hand film. Since the reflected light is still RHCPL, it is essentially completely transmitted by the left-hand film. Thus, the combination of liquid crystal films having the same $\lambda_o$ values but being opposite in intrinsic rotatory sense effectively transmits all of the incident light with the exception of the wavelength band centered around $\lambda_o$. This result is illustrated in FIG. 2.

Hereinafter any pair of liquid crystal films, each having an opposite intrinsic rotatory sense to that of the other, but which together will essentially completely transmit all incident radiation with the exception of a wavelength band centered about some wavelength $\lambda_o$ will be referred to as a complementary matched pair of liquid crystal films.

The effect achieved by such a combination of liquid crystal films may be utilized in various ways. For example, where a broad band continuous source which also contains a narrow band source, e.g., A Xenon lamp, is used as a light source the narrow band radiation may be removed from the source without removing any of the broad band radiation. Moreover, any number of optical filters consisting of combinations similar to that described can be stacked in series to remove any number of different bands of radiation from a light source. Very important practical advantages of such filters is that they may be provided in relatively large sizes and are relatively inexpensive since they are not difficult to make and the materials are themselves not expensive.

The novel technique of the invention may also be utilized to provide enhanced image brightening. It is well known in the art that the pitch of a cholesteric liquid crystalline film may be quite sensitive to stimuli such as temperature, pressure, shear magnetic fields, electric fields, chemical vapors, ultra-violet light and others. Thus, when the pitch of the cholesteric liquid crystal substance is changed in response to some stimulus the color of the reflected light will change. These cholesteric liquid crystal films can therefore be used as monitoring techniques to detect the presence of such stimuli or to indicate changes in the stimuli themselves. The optical filter combinations of the invention can be utilized to intensify the light reflected by the system. It can be seen that by arranging a complementary matched pair of cholesteric liquid crystal films in the path of incident light, the reflected light will be more intense by a factor of up to two than in the situation when only a single film is utilized for this purpose. Thus, such monitoring techniques can be made substantially more sensitive through the use of the optical filter system of the invention.

The invention will be more fully appreciated and understood from the following detailed description of various preferred embodiments thereof particularly when read in conjunction with the accompanying drawings in which.

Figure 1:
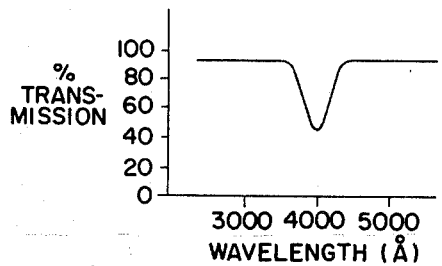
FIG. 1 is a graphical illustration of the intensity of the output obtained when incident white light is directed on a single cholesteric liquid crystal film having a certain $\lambda_o$.
Figure 2:
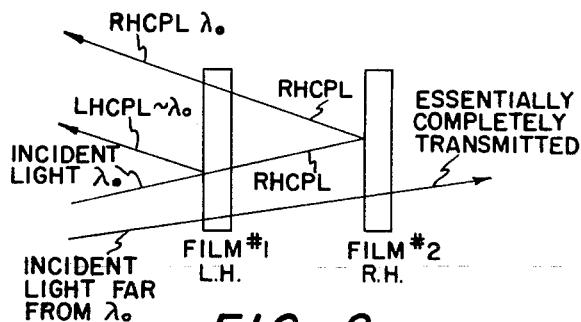
FIG. 2 is a diagrammatic illustration describing the effect which occurs when incident light is directed upon a typical optical filter of the invention.
Figure 3:
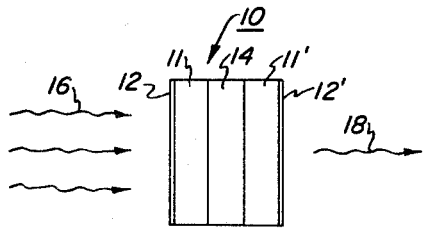
FIG. 3 and 3a are schematic side cross-sectional views of typical optical filters constructed according to the invention.

Referring now to FIG. 3 there is shown an optical filter, generally designated 10, having cholesteric liquid crystal films 11 and 11' with protective members 12 and 12' respectively and separated by optional spacing member 14. The cholesteric liquid crystal films are selected to have the same $\lambda_o$ value but to be opposite in intrinsic rotatory sense. In this embodiment, for purposes of illustration, films 11 and 11' each have $\lambda_o$ value of about 5,000A with one being right-handed and the other left-handed. It should be recognized that the position of the two films with respect to each other may be varied without affecting the operation of the device, i.e., either one may be positioned in front of the other.

Any suitable cholesteric liquid crystalline substance, mixtures thereof or compositions comprising cholesteric liquid crystals or compositions having liquid crystalline characteristics may be employed in the optical filter systems of the invention. Typical suitable cholesteric liquid crystals include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl propionate; cholesteryl acetate; cholesteryl valerate; cholesteryl vacconate; cholesteryl linolate; cholesteryl linoleate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy)ethyl carbonate; cholesteryl-2-(2-butoxyethoxy)ethyl carbonate; cholesteryl-1-2-(2-methoxyethoxy)ethyl carbonate; cholesteryl geranyl carbonate; cholesteryl heptyl carbamate; and alkyl amides and aliphatic secondary amines derived from 3β-amino$\Delta$5-cholestene and mixtures thereof; peptides such as poly-γ-benzyl-l-glutamate; derivatives of beta sitosterol such as sitosteryl chloride; and amyl ester of cyan benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Compositions containing cholesteric liquid crystals and nematic liquid crystalline substances may also be utilized as the liquid crystal films of the optical filter system; and it has been found that such compositions may contain up to 98 percent by weight of the nematic component yet continue to function in accordance with the invention. Any suitable nematic liquid crystalline substance may be employed in this manner. Typical suitable nematic liquid crystals which can be used in combination with cholesteric liquid crystalline substances include: p-azoxy-anisole, p-ozoxyanisole, p-azoxyphenetole, p-butoxybenzoic acid, p-methoxy-cinnaminic acid, butyl-p-anisylidene-p'-amino-cinnamate, anisylidene para-amino-phenylacetate, p-ethoxy-benzalamino-a-methyl-cinnamic acid 1,4-bis (p-ethoxy benzylidene) cyclo hexanone, 4,4'-dihexyloxybenzene, 4,4'-diheptyloxybenzene, anisal-p-aminoazobenzene, anisaldazine, a-benzeneazo-(anisal-$\alpha'$-naphthylamine), anisylidene-p-n-butylaniline, n,n'-nonoxybenzelto luidine, mixtures of the above and many others.

Compositions suitable for use as liquid crystal films of the novel optical filter system may also comprise mixtures of cholesteric liquid crystals and suitable smectic liquid crystalline substances as well as mixtures of cholesteric liquid crystals and suitable non-liquid crystalline substances which are compatible with the cholesteric liquid crystal component. Typical suitable non-liquid crystalline materials include cholesterol, lecithin and the like. Typical suitable smectic liquid crystalline substances include n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater, cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids' ethyl-p-azoxycinnamate; ethyl-p-4-ethoxybenzylideneaminocinnamate; ethyl-p-azoxybenzoate; potassium oleate; ammonium oleate; p-n-octyloxy benzoic acid; the low temperature mesophase of 2-p-n-alkoxy-genzylidenneaminofluorenones with chain length of 7 or greater; the low temperature mesophase of p-(n-heptyl) oxybenzoic acid; anhydrous sodium stearate; thallium (I) stearate; mixtures thereof and others.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly by heating the mixed components above the isotropic transition temperature.

The above lists of typical suitable liquid crystalline substances are intended to encompass mixtures of the above. These lists are intended to be representative only and are not to be construed as being exhaustive or limiting the invention to the specific materials mentioned. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as those mentioned above will only possess the necessary properties which make them suitable for use according to the invention at some specific temperature range which may be at room temperature or substantially below or above room temperature. However, all of the various substances, mixtures or combinations thereof will function according to the method at some temperature. Typically, the optical filter system of the invention will be used at or near room temperature. Generally speaking, the liquid crystal substance will preferably be in the liquid crystal state at the desired operational temperature. For optimum results the liquid crystal films employed in the optical filters of the invention will preferably have a thickness of from about 0.5 to about 20 microns. The effects obtained in accordance with the invention do not depend on film thickness except to the extent that the film thickness should preferably be greater than $\lambda_o$ in order to produce full intensity in the reflected light. When the films are relatively thin, i.e., when they have a thickness less than wavelength $\lambda_o$, they will typically not selectively reflect light around $\lambda_o$ as efficiently as previously described. When the films are of relatively great thickness then the molecules will usually not align properly and the observed behavior will not be consistent with the optimum results attainable with this optical filter system. For liquid crystal films which have a $\lambda_o$ in the visible region, film thickness of from about 3 to about 10 microns will give optimum results.

The liquid crystal films 11 and 11' are typically tacky, soft, viscous, glassy or liquid and thus are preferably covered with protective outer layers 12 and 12' respectively to protect the films from foreign matter such as dust, insects or the like. The purpose of the protective outer layers is to keep the liquid crystal films in place and free from any contamination. Thus, the protective outer layers may be of any suitable material, flexible or rigid, which is optically transparent to the incident light radiation and which is non-reactive with the liquid crystalline films or other components of the optical filter. Typical suitable materials for this purpose include glass, clear plastics such as, for example, Tedlar, Mylar, polyethylene, polypropylene or the like, and any other materials having the required characteristics. It is further preferred to utilize materials which have an index of refraction about the same as that of the liquid crystal films to minimize loss of light. The protective outer layers would typically be of a thickness of from about 0.25 to about 10 mils.

Spacer member 14 is an optional component of the optical filter system of the invention. Spacer member 14 may be any suitable material which is optically isotropic and transparent to the incident light radiation. Typical suitable materials include glass, fused silica and any other materials having the required characteristics. It is further preferred to utilize materials which have an index refraction about the same as that of the liquid crystal films to minimize reflection loss of light.

For optimum results the optical filter 10 is preferably arranged in the path of a light beam from a light source in a manner such that the incident radiation, in this case visible light, represented by arrows 16 reaches the filter at normal incidence with liquid crystal films 11 and 11' being preferably disposed so that the helical axes of the liquid crystal films are in the direction of the light propagation. The characteristics of the emergent beam 18 are graphically illustrated in FIG. 4. It is seen that the optical filter 10 essentially completely transmits all wavelengths of incident radiation except for those in the band centered around $\lambda_o$ (in this case $\lambda_o$ = about 5,000A) for the liquid crystal films 11 and 11', whereas the wavelengths centered about $\lambda_o$ are substantially completely reflected and removed from the emergent beam. Of course it should be understood that where the incident radiation is not at normal incidence to the liquid crystal films so that the helical axes of the liquid crystal substances are not exactly along the direction of the light propagation, the optical filter will continue to function according to the invention, however with some deterioration in the bandwidth of the reflected wavelength band. Details relating to the compositions of the liquid crystal films and the preparation of the optical filter are given in Example I.

Figure 3A:
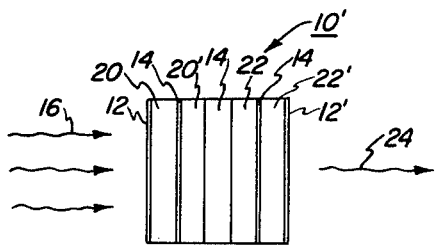
Figure 4:
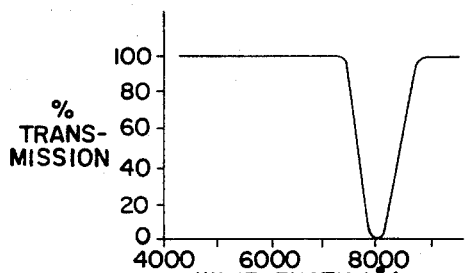
FIG. 4 and 4a are graphical illustrations of the intensity of the output obtained when incident white light is directed upon the optical filters shown in FIGS. 3 and 3a respectively.
Figure 4A:
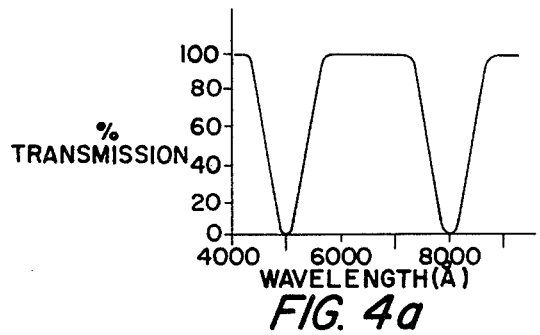

FIG. 3a illustrates another preferred embodiment of the invention. There is seen an optical filter having two sets of complementary matched liquid crystal films stacked in series. Thus, liquid crystal films 20 and 20' have $\lambda_o$ values of about 5,000A and are right-handed and left-handed respectively; and liquid crystal films 22 and 22' have $\lambda_o$ values of about 8,000A and are left-handed and right-handed respectively. The characteristics of the emergent beam 24 are shown in FIG. 4a. A detailed description of the compositions employed for the liquid crystal films and the preparation of the optical filter is set forth in Example II. Either pair of complementary matched liquid crystal films can be placed closest to the incident light directed upon the filter. Alternatively the individual liquid crystal films can be located in any random order and continue to give the same results.

Of course, the embodiments shown in FIGS. 3 and 3a are meant to be representative only since, as has been previously discussed, any number of matched complementary pairs of liquid crystal films may be arranged in series to form an optical filter. Further, although the $\lambda_o$ values of the liquid crystals in the embodiments described have been shown as being in the visible spectrum, optical filters may be constructed according to the invention which will remove selected wavelength bands in any region of the light spectrum. Optical filters can be prepared which will remove selected wavelength bands in the light spectrum at wavelengths of from about 2,700 A to about 10 microns.

Figure 5:
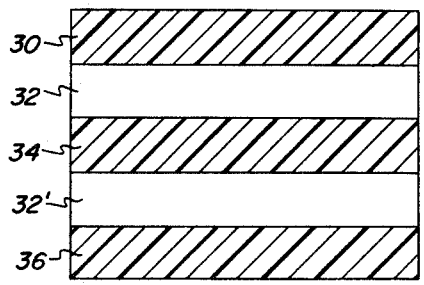
FIG. 5 is a schematic side cross-sectional view of an embodiment of the invention suitable for detecting various foreign stimuli or changes therein.

FIG. 5 illustrates an embodiment of the invention wherein the image brightening characteristics of the invention are utilized. There is seen a clear cover sheet 30 arranged above a pair of liquid crystal films 32 and 32' having the same $\lambda_o$ but being of opposite rotary sense and separated by clear spacer 34. The bottom member 36 of the device can be any optically transparent material and preferably is a sheet of black Mylar. Such a device can be used for thermography, printed circuit hot spot detection and the like. The Mylar surface of the device is placed against the surface of interest and any shift in the color of the reflected light can be observed. By arranging two liquid crystal films in this manner the intensity of the reflected light is increased by approximately a factor of two. Details concerning the preparation of the device are found in Example III.

Figure 6:
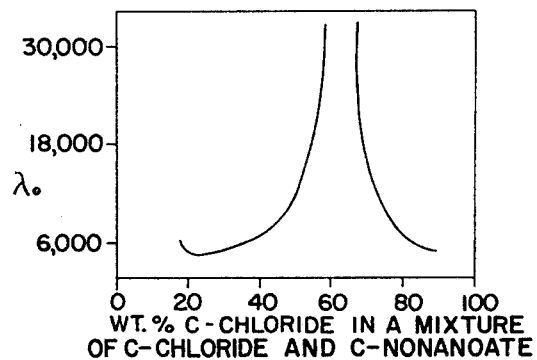
FIG. 6 is a graphical illustration showing $\lambda_o$ vs composition for compositions containing various amounts of two cholesteric liquid crystal substances having opposite intrinsic screw sense.

FIG. 6 graphically illustrates the $\lambda_o$ values which can be obtained from a mixture of two cholesteric liquid crystal substances. It has been found that the pitch of two component mixtures of certain cholesteric liquid crystal is a strong function of composition. Over a wide range of materials the pitch of a mixture can be accurately represented by a weighted average of the ingredients. Further, if components with opposite intrinsic screw sense, i.e., right-handed and left-handed, are mixed there will exist one composition corresponding to no net rotation or infinite pitch. A detailed discussion of this phenomenon is found in *Liquid Crystals and Ordered Fluids*, J. E. Adams, W. Haas and J. J. Wysocki, Page 463, Plenum Press, 1970.

In this exemplary case the compositions are made from cholesteryl nonanoate, a left-handed fatty ester and cholesteryl chloride, a right-handed liquid crystal substance. The percentage composition of the two components of the mixture are plotted against $\lambda_o$ where $\lambda_o = 2\ np$. It can be seen that at a particular composition the left-handed and the right-handed components essentially compensate and the result is an infinite pitch. Moving away from this point the sense of the composition is determined by the dominant component. Defining the per cent of cholesteryl chloride in any mixture as A and that in the composition having infinite pitch as A* it was found that when A<A* the films are left-handed and for the cases where A>A* the films are right-handed. Thus, liquid crystal films having any desired $\lambda_o$ value may be prepared by resort to this technique.

The invention will now be further described with reference to specific preferred embodiments by way of examples to further aid those skilled in the art to practice the invention, it being understood that these are intended to be illustrative only and the invention is not limited to the conditions, materials or devices recited therein. All parts and percentages recited are by weight unless otherwise specified.

The behavior of the optical filters in the Examples is observed by measuring their transmission spectrum with a Cory Spectrometer. The reflection spectrum for each of the filters can be inferred from its transmission spectrum since there is only negligible absorption in each instance.

EXAMPLE I

A composition of 65 percent anisylidene-p-n-butylaniline (ABUTA) in cholesteryl oleyl carbonate (COC) is prepared. This composition is left-handed and has a $\lambda_o$ value of about 8,000A. A composition of 86 percent cholesteryl chloride (CC) in cholesteryl nonanonate (CN) is prepared. This composition is right-handed and has a $\lambda_o$ value of about 8,000A. A thin film of the ABUTA in COC composition is applied to a thin glass plate and a thin layer of Mylar Sheet is placed over the free surface of the liquid crystal film. A thin film of the CC in CN composition is then applied to the free surface of the thin glass plate and subsequently the free surface of the latter liquid crystal layer is covered with another thin glass plate. Incident light from a broad band incandescent source of visible light is directed upon the optical filter at normal incidence. The transmission spectrum obtained is shown in FIG. 4. It can be seen that the filter transmits substantially completely all of the incident radiation with the exception of the wavelength band centered about 8,000A.

EXAMPLE II

Two complementary matched pairs of liquid crystal films are incorporated into an optical filter in the following manner. A composition of 57 percent cholesteryl formate (CF) in cholesteryl nonanoate (CN) is prepared. This composition is left-handed and has a $\lambda_o$ value of about 5,000A. A composition of 90 percent cholesteryl chloride (CC) in cholesteryl oleyl carbonate (COC) is prepared. This composition is right-handed and has a $\lambda_o$ value of about 5,000A. A thin film of the CF in CN composition is applied to a thin glass plate and a second thin glass plate placed over the free surface of the liquid crystal film. A thin film of the CC in COC composition is then applied to the free surface of the second glass plate and subsequently a thin layer of Mylar Sheet is placed on the free surface of the latter liquid crystal layer.

Then to the free surface of the first glass plate is applied a thin layer of the 65 percent ABUTA in COC composition (described in Example I). Over the liquid crystal layer is placed a third glass plate and to the free surface of the third glass plate there is applied a thin layer of the 86 percent CC in CN composition (described in Example I). This latter liquid crystal layer is then covered with a thin layer of Mylar Sheet. Incident light from a broad band incandescent source of visible light is directed upon the optical filter at normal incidence. The transmission spectrum obtained is shown in FIG. 4a. It can be seen that the filter transmits substantially completely all of the incident radiation with the exception of two wavelength bands centered about 5,000A. and 8,000A respectively, these bands being substantially completely reflected.

EXAMPLE III

A detection device suitable to detect the presence of stimuli such as temperature, pressure, chemical vapors and others is constructed in the following manner. A composition of 10 percent cholesteryl chloride (CC) in cholesteryl oleyl carbonate (COC) is prepared. This composition is left-handed and has a $\lambda_o$ value of about 5,900A. A composition of 10 percent CC in cholesteryl bromide (CB) is prepared. This composition is right-handed and has a $\lambda_o$ value of about 5,900A. A thin layer of the CC in COC composition is applied to one surface of a thin glass plate and a second glass plate is placed over the free surface of the liquid crystal layer. To the free surface of the first glass plate there is applied a thin layer of the CC in CB composition and subsequently a thin film of Black Mylar sheet is placed over the free surface of the latter liquid crystal film. The device is used by placing the Black Mylar component against any surface of interest and viewing through the glass cover plate. By employing this structure for the detection device and light reflected the intensified by a factor of approximately two over a similar device which has only one liquid crystal film.

EXAMPLE IV

The procedure described in Example I is followed using a composition of 70 percent cholesteryl-2-(2-butoxyethoxy) ethyl carbonate (CBEC) in CC, a right-handed composition having a $\lambda_o$ value of about 1.0 microns and a composition of 30 percent CC in COC, a left-handed composition having a $\lambda_o$ value of about 1.0 microns.

EXAMPLE V

The procedure described in Example I is followed using a composition of 80 percent of equal parts of CC and cholesteryl butyrate (CB) in equal parts of CF and cholesteryl decanoate (CD), a right-handed composition having a $\lambda_o$ value of about 1.2 microns and a composition of 49 percent CC in CN, a left-handed composition having a $\lambda_o$ value of about 1.2 microns.

The invention has been described in detail with respect to various embodiments and further by way of specific preferred embodiments. It should be recognized, however, that the invention is not limited to the embodiments described but rather that modifications and variations can be made in practice thereof which are within the spirit of the invention and the scope of the claims. For example, the optical filter may be tilted with respect to the incident light beam so that the incident light is not normal to the filter. In this manner the $\lambda_o$ value of the liquid crystal films will be shifted.

It is also possible to employ one right-handed and one left-handed liquid crystal film which do not have the same intrinsic $\lambda_o$ value. By rotating one while holding the other fixed their respective reflection spectrum may be brought into coincidence at which point they constitute a complementary matched pair of liquid crystal films within the scope of the invention. A detailed discussion relating to the technique of rotating the liquid crystal films with respect to the incident light is found in U.S. patent application entitled "Tuning Method for Optical Devices," Ser. No. 104,368, filed on Jan. 6, 1971 and which is herein incorporated by reference. Other modifications of the present invention can include changing the $\lambda_o$ value of the liquid crystal films by exposure to stimuli such as chemical vapors, electric fields, magnetic fields, etc.

What Is Claimed Is:

1. An optical filter comprising at least one complementary matched pair of liquid crystal films having optically negative characteristics, the two films in each pair having the opposite rotatory sense from each other and being arranged so that incident light in the band centered about some wavelength $\lambda_o$ will be essentially completely reflected by said pair while the remainder of the incident light having wavelengths outside of the band centered around $\lambda_o$ will be essentially completely transmitted by said pair.

2. The optical filter as claimed in claim 1 wherein $\lambda_o$ for each said complementary matched pair of liquid crystal films is in the visible region of the light spectrum.

3. The optical filter as defined in claim 1 wherein each liquid crystal film of each said complementary matched pair of liquid crystal films is from about 0.5 to about 20 microns in thickness.

4. The optical filter as defined in claim 2 wherein each liquid crystal film of each said complementary matched pair of liquid crystal films is from about 3 to about 10 microns in thickness.

5. The optical filter as defined in claim 1 wherein each liquid crystal film of each said complementary matched pair of liquid crystal films comprises a composition chosen from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with cholesteric liquid crystalline substances; and mixtures thereof.

6. A method for removing at least one wavelength band from incident light radiation while substantially retaining all other wavelengths of light within the incident radiation comprising:
   a. providing a light source;
   b. providing an optical filter comprising at least one complementary matched pair of liquid crystal films having optically negative characteristics, the two films in each pair having the opposite rotatory sense from each other and being arranged so that incident light in the band centered about some wavelength $\lambda_o$ will be essentially completely reflected by said pair while the remainder of the incident light having wavelengths outside of the band centered around $\lambda_o$ will be essentially completely transmitted by said pair; and
   c. directing light from said light source upon said optical filter whereby the emergent light beam contains all the wavelengths of light of the incident radiation with the exception of a wavelength band corresponding to each said complementary matched pair of liquid crystal films.

7. The method as defined in claim 6 whrein said incident light is directed upon said optical filter at an angular incidence of from about 80° to about 100°.

8. The method as defined in claim 6 wherein said incident light is directed upon said optical filter at normal incidence.

9. The method as defined in claim 8 wherein $\lambda_o$ for each said complementary matched pair of liquid crystal films is in the visible region of the light spectrum.

10. The method as defined in claim 9 wherein each liquid crystal film of each said complementary matched pair of liquid crystal films is from about 3 to about 10 microns in thickness.

11. The method as defined in claim 6 wherein each liquid crystal film of each said complementary matched pair of liquid crystal films is from about 0.5 to about 20 microns in thickness.

12. The method as defined in claim 6 wherein each liquid crystal film of each said complementary matched pair of liquid crystal films comprises a composition chosen from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with cholesteric liquid crystalline substances; and mixtures thereof.

13. A detection device for indicating the presence of stimuli to which liquid crystal substances having optically negative properties are sensitive comprising an optically transparent and isotropic spacing member carrying on each surface thereof a thin layer of a liquid crystalline substance having optically negative properties, said layers of liquid crystalline substances comprising a complementary matched pair of liquid crystal layers, each of said layers of liquid crystalline substances carrying on the respective surfaces thereof remote from said spacing member a thin layer of an optically transparent material, the two layers in said pair having the opposite rotatory sense from each other and being arranged so that incident light in the band centered about some wavelength $\lambda_o$ will be essentially completely reflected by said pair while the remainder of the incident light having wavelengths outside of the band centered around $\lambda_o$ will be essentially completely transmitted by said pair.

14. The device as defined in claim 13 wherein at least one of said layers of optically transparent material carried by said layers of liquid crystalline substances is flexible.

15. The device as defined in claim 14 wherein one of said layers of optically transparent material comprises Black Mylar Sheet.

16. The device as defined in claim 15 wherein the $\lambda_o$ value of said complementary matched pair of liquid crystal layers is in the visible region of the light spectrum.

17. The device as defined in claim 13 wherein each layer of liquid crystalline substance comprises a composition chosen from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with the cholesteric liquid crystalline substances; and mixtures thereof.

18. The device as defined in claim 13 wherein the $\lambda_o$ value of said complementary matched pair of liquid crystal layers is in the visible region of the light spectrum.

19. The device as defined in claim 18 wherein each of said layers of liquid crystalline substance is from about 3 to about 10 microns in thickness.

20. The device as defined in claim 13 wherein each of said layers of liquid crystalline substance is from about 0.5 to about 20 microns in thickness.

* * * * *